(12) United States Patent
Feller

(10) Patent No.: US 7,501,978 B2
(45) Date of Patent: Mar. 10, 2009

(54) SHORT-DISTANCE RANGING SYSTEM

(75) Inventor: Walter J. Feller, Airdrie (CA)

(73) Assignee: NovAtel Inc., Calgary, Alberta (CA)

( * ) Notice: Subject to any disclaimer, the term of this patent is extended or adjusted under 35 U.S.C. 154(b) by 301 days.

(21) Appl. No.: 11/594,291

(22) Filed: Nov. 8, 2006

(65) Prior Publication Data

US 2007/0103273 A1 May 10, 2007

Related U.S. Application Data

(60) Provisional application No. 60/735,036, filed on Nov. 9, 2005.

(51) Int. Cl.
*G01S 13/84* (2006.01)
(52) U.S. Cl. .............. 342/42; 342/44; 342/51; 340/10.1; 340/10.34
(58) Field of Classification Search .................. 342/42, 342/44, 51; 235/384; 340/10.1, 10.3, 10.34, 340/10.41, 10.51, 5.61, 572.1
See application file for complete search history.

(56) References Cited

U.S. PATENT DOCUMENTS

| | | | | |
|---|---|---|---|---|
| 5,053,774 A * | 10/1991 | Schuermann et al. | .... | 340/10.34 |
| 5,294,931 A * | 3/1994 | Meier | .......... | 342/44 |
| 5,410,315 A * | 4/1995 | Huber | ..... | 340/10.32 |
| 6,157,321 A | 12/2000 | Ricci | | |
| 6,499,656 B1 * | 12/2002 | Marsh et al. | ........ | 235/375 |
| 6,593,845 B1 * | 7/2003 | Friedman et al. | ....... | 340/10.33 |
| 2006/0279412 A1 * | 12/2006 | Holland et al. | ......... | 340/10.51 |
| 2007/0007343 A1 * | 1/2007 | Ganz | ...... | 235/435 |
| 2007/0013524 A1 * | 1/2007 | Ganz | ..... | 340/572.7 |
| 2007/0103273 A1 * | 5/2007 | Feller | ....... | 340/10.2 |

FOREIGN PATENT DOCUMENTS

| | | |
|---|---|---|
| CA | 2320672 | 10/2002 |
| WO | WO 98/16849 | 4/1998 |
| WO | WO 2005/114593 | 12/2005 |

* cited by examiner

*Primary Examiner*—John B Sotomayor
(74) *Attorney, Agent, or Firm*—Cesari and McKenna, LLP; Patricia A. Sheehan

(57) ABSTRACT

A system for ascertaining the range from an interrogator to one or more transponders comprises an interrogator that transmits an RF carrier that is received by each transponder, the energy in the received carrier being used to charge up a storage capacitor in each senses the termination of the received carrier and initiates a known delay interval different from those of the other transponders. At the end of the delay interval, the transponder transmits an RF signal which is received by the interrogator. The interrogator then calculates the range to the transponder by subtracting the known delay interval from the round trip time registered in the timer.

5 Claims, 2 Drawing Sheets

SHORT-DISTANCE RANGING SYSTEM

CROSS-REFERENCE TO RELATED APPLICATIONS

The present application claims the benefit of U.S. Provisional Patent Application Ser. No. 60/735,036, which was filed on Nov. 9, 2005, by Walter J. Feller for a SHORT-DISTANCE RANGING SYSTEM and is hereby incorporated by reference.

BACKGROUND OF THE INVENTION

1. Field of the Invention

This invention relates to the determination of the distance from a primary location to the location of the nearby object. More particularly, it relates to the use of a radio-frequency ranging signal to obtain the distance from the primary location to a transponder located nearby.

2. Background Information

For the measurement of relatively short ranges, laser ranging devices are the most commonly used. However, these devices are too cumbersome and expensive for many applications. Also they are unsuitable for use in situations where simultaneous measurement of ranges to multiple objects is desired. Further, optical signals can be obscured by foliage or other optically intervening objects, or greatly diminished by fog. The present invention is a response to these shortcomings.

SUMMARY OF THE INVENTION

The invention makes use of a transponder that is powered by an RF (radio frequency) signal from an interrogation unit. The transponder is, in some respects, similar to the radio frequency identification ("RFID") tags used to identify objects that are relatively close at hand. In those arrangements a "scanner" transmits an RF signal that is picked up by a tag and rectified to charge up a power capacitor. The energy in the capacitor powers a transmitter for a short interval, during which the tag transmits back to the scanner a code identifying the tag.

In accordance with the invention, an interrogation unit transmits an RF signal for a selected interval. The signal is rectified in the transponder, again to charge up a power capacitor. A receiver powered by the charge on the capacitor senses the cessation of the incoming signal, and the cessation results in the start of an accurately timed delay interval. Upon expiration of the delay interval, a transmitter returns to the interrogation unit a signal which may include a code identifying the transponder.

The interrogation unit, having recorded the time at which its transmission terminated, the length of the delay interval in the transponder and the time when the signal from the transponder is received, can easily calculate the distance to the transponder. With the use of radio frequency signals it is much less likely that intervening objects or fog, or the like, will interfere with the range measurements.

The invention can also be operated in reverse with multiple transponders whose positions are known. A moveable interrogation unit can then ascertain its position by measuring the ranges to the responders and finding the intersection of circles centered on the transponders, the radii of the circles being the ranges to the respective transponders.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
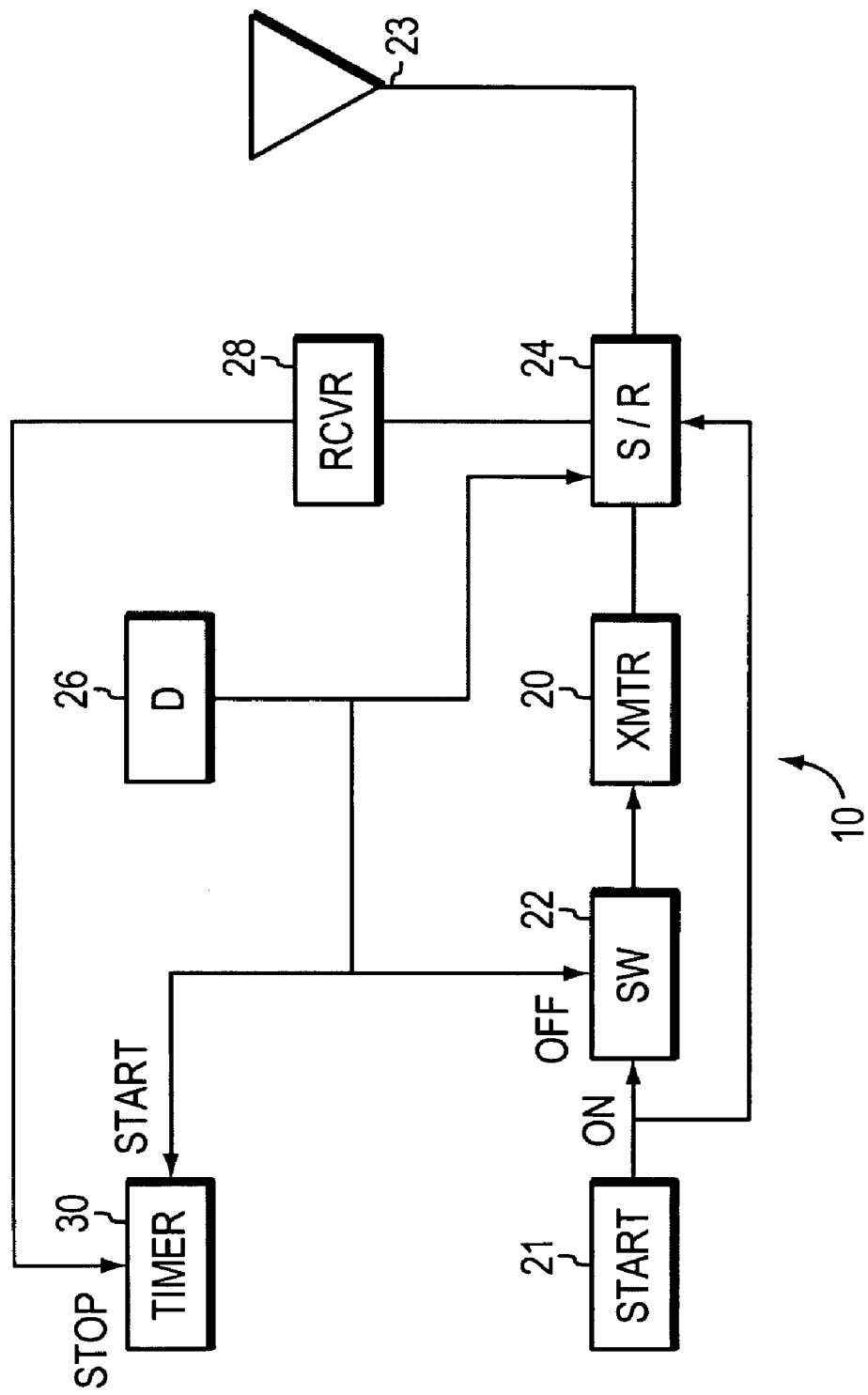
FIG. 1 is a diagram of an interrogation unit incorporating the invention.

As shown in the drawing, a ranging system incorporating the invention includes an interrogation unit 10 (FIG. 1) and a transponder 12 (FIG. 2) whose distance from the interrogation unit is to be determined. The interrogation unit includes a transmitter 20 which, upon initiation of a range determination by a start button 21 by way of a switch 22, transmits an RF output over an antenna 23 by way of a send/receive switch 24, positioned by the start button 26. At the end of a predetermined interval, e.g. one second, a delay unit 26 turns off the transmitter, causes the switch 24 to connect the antenna 22 to a receiver 28 and starts a timer 30. The interrogator unit also includes a micro processor and associated memory, or an ASIC, neither of which is shown herein, that perform some of the functions described herein, including, for example, those of the delay unit 26 and timer 30.

Figure 2:
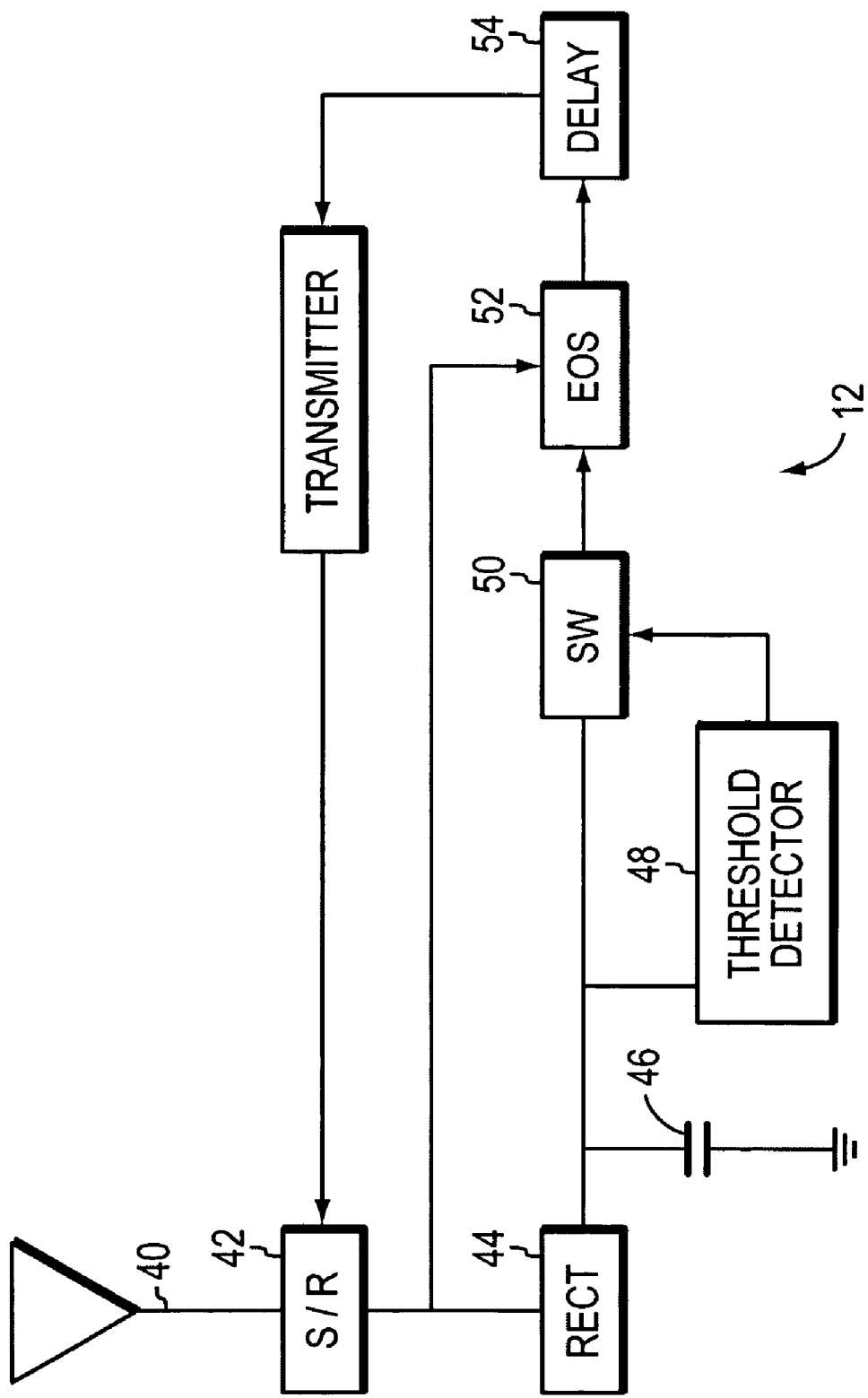
FIG. 2 is is a diagram of a transporter incorporating the invention.

With reference to FIG. 2, the transponder 12 includes an antenna 40, connected to a send/receive switch 42 which, in its depicted configuration, passes the incoming signal to a rectifier 44. The output of the rectifier, in turn, charges a power capacitor 46. A threshold detector 48 senses the rise of the capacitor voltage above a predetermined threshold, upon which it connects the capacitor to an end-of-signal detector 52, which is a receiver tuned to the frequency of the signal transmitted by the interrogation unit 10.

When the detector 52 senses the termination of the incoming signal, it initiates a known delay interval provided by a delay unit 54. At the end of the delay interval, the delay unit output turns on a transmitter 50 and changes the position of the switch 42 to connect the transmitter 50 to the antenna 40.

At the interrogation unit 10 the receiver 28 receives the signal transmitted by the responder and stops the timer 30, which thus records the round trip time from the cessation of the transmission by the transmitter 20 and the receipt of the response from the transponder 12. The range to the transponder is calculated by subtracting the delay interval in the transponder from the content of the timer 29 to provide the total atmospheric portion of the RF roundtrip. The distance from the interrogation unit to the transmitter is thus one-half the atmospheric portion of the round trip time, divided by the speed of light (c).

The transmission interval provided by the delay unit 26 in the scanner should be long enough to provide sufficient charge on the power capacitor 46 for operation of the transponder. The delay provided by the transponder delay unit 54 is preferably substantially longer than any delay in the detector 52. The power $P_R$ in milliwatts, received by the transponder 12 is given by:

$$P_R = 0.001 \text{ (loss over 1 meter)} * \text{(gain in antenna 23)} * \text{(gain in antenna 40)} * 1000 \, Pt/R^2$$

Where $P_T$ is the transmitter 20 output power in watts, and

R is the range in meters from the scanner 10 to the transponder 12.

Assume, for example, that the transmitter 20 has a power of 2 W, the gain of the is antenna 22 is 6 dBi (a factor of 4), and the gain of the transponder antenna 40 is 0 dBi.

For a range of 8 meters this would result in a received power, Pr, of 0.063 mW, corresponding with 0.1535V, given a free space impedance of 377 ohms.

Assume also a 20% efficiency in the circuitry that charges and discharges the power capacitor 46. This will provide a charging current of only about 10 uA for one second. However the transponder will transmit for about 1 msec and the capacitor 46 can thus provide ~10 mA at 1.2 volts for that interval. If the transmitter 50 is 20% efficient, it will transmit 2.4 mW of power.

With an 8-meter range, the interrogator will then receive ~0.15 μW (−38 dBm) of power, which is well above the thermal noise level, the thermal noise being −174 dBm/Hz, and assuming the transmitter is receiving all 1 ms of the transmission the thermal noise will be −144 dBm. This is far lower than the possible received power, so even with a high noise figure the receiver will have no problem detecting the signal.

The invention can easily be extended to the measurement of ranges to multiple transponders by using different, known delays in each of the transponders. For example, with a maximum range of eight meters and thus a round trip atmospheric propagation time of up to 54 nsec the first transponder might have an internal delay of 1 μsec, readily generated with acoustic wave devices, the second might have a delay of 2 μsec, the third a delay of 3 μsec, and so on. The interrogator can then easily separate the return signals from the transponders by means of the time slots in which they arrive.

Also, each transponder may transmit a unique code identifying the transponder to the interrogator. It may also transmit on a different frequency from the frequencies of the other transponder, the frequency being used to identify the transponder to the interrogation unit.

What is claimed is:

1. A method of determining the range from an interrogator to one or more transponders, the method comprising the steps of:
   A. in the interrogator transmitting an interrogation RF carrier;
   B. in each transponder
      (1) receiving the carrier, rectifying it, and
      (2) charging a power capacitor with the rectified carrier;
   C. in the interrogator, terminating the RF carrier;
   D. in each transponder:
      1) sensing termination of the receipt of the RF carrier, and
      2) subsequently transmitting an RF response;
   E. in the interrogator:
      1) receiving the RF responses, and
      2) calculating the distance to each transponder from the elapsed time between the termination of the interrogation RF carrier and the receipt of the RF responses from the respective transponders and from the timing, of the responses from the respective transponders.

2. The method defined in claim 1 in which
   A. a first one of the transponders transmits its RF response after a basic delay interval, substantially greater than the round trip RF propagation time between the interrogator and the transponder, and
   B. the other transponders have delay intervals that are different multiples of the basic delay interval.

3. The method of claim 1 in which each transponder includes in its response an identification of the transponder.

4. A system for determining the range from an interrogator to one or more transponders, the system comprising;
   A. in the interrogator, a transmitter for transmitting an interrogation RF carrier;
   B. in each transponder, means for
      1) receiving the RF carrier,
      2) rectifying the received carrier, and
      3) charging a power capacitor with the rectified carrier;
   C. in the interrogator means for terminating the RF carrier;
   D. in each transponder;
      1) means for sensing the termination of the receipt of the RF carrier, and
      2) means for transmitting an RF response; and
   E. in the interrogator
      1) means for receiving the RF responses and
      2) means for calculating the distance to each transponder from the elapsed time between the termination of the RF carrier and the receipt of the RF responses from the respective transponders.

5. The system of claim 4
   A. including in each transponder, means for delaying the transmission of its response by a delay interval different from those of the other transponders; and
   B. in which the calculating means subtracts the delay interval in each transponder from the elapsed time in calculating the range to that transponder.

\* \* \* \* \*